(12) United States Patent
Wang et al.

(10) Patent No.: US 8,841,378 B2
(45) Date of Patent: Sep. 23, 2014

(54) POLYMERIC PARTICLES AND PROCESSES FOR PREPARATION OF POLYMERIC PARTICLES THAT INVOLVE MOLDING

(75) Inventors: Xiaorong Wang, Hudson, OH (US); George Böhm, Akron, OH (US)

(73) Assignee: Bridgestone Corporation, Tokyo (JP)

(*) Notice: Subject to any disclaimer, the term of this patent is extended or adjusted under 35 U.S.C. 154(b) by 1312 days.

(21) Appl. No.: 12/166,633

(22) Filed: Jul. 2, 2008

(65) Prior Publication Data

US 2009/0012225 A1    Jan. 8, 2009

Related U.S. Application Data

(60) Provisional application No. 60/947,498, filed on Jul. 2, 2007.

(51) Int. Cl.
*B32B 5/16* (2006.01)
*B29B 9/10* (2006.01)
*C08J 3/12* (2006.01)
*C08J 3/24* (2006.01)

(52) U.S. Cl.
CPC ..... *C08J 3/12* (2013.01); *C08J 3/24* (2013.01)
USPC .................................... 524/500; 264/5; 264/6

(58) Field of Classification Search
USPC ........................ 524/500, 501, 502; 264/5, 6
See application file for complete search history.

(56) References Cited

U.S. PATENT DOCUMENTS

| | | | |
|---|---|---|---|
| 6,071,463 A * | 6/2000 | De'ath | ...................... 264/328.16 |
| 6,497,921 B1 | 12/2002 | Carbonell et al. | |
| 6,652,920 B2 | 11/2003 | Carbonell et al. | |
| 2001/0024716 A1 * | 9/2001 | Chen et al. | ................. 428/317.9 |
| 2004/0033316 A1 | 2/2004 | Carbonell et al. | |

FOREIGN PATENT DOCUMENTS

JP    2001316595 A  * 11/2001

OTHER PUBLICATIONS

Machine Translation of JP 2001-316595.*
Human Translation of JP 2001-316595.*
Euliss, Larken E. et al., "Monodisperse Nanocarriers: Novel Fabrication of Polymeric Nanoparticles for Bio-Nanotechnology", Proceedings of the SPIE—The International Society for Optical Engineering, vol. 6153, pp. 61534A-1-8 (2006).

* cited by examiner

*Primary Examiner* — Ling Choi
*Assistant Examiner* — Chun-Cheng Wang
(74) *Attorney, Agent, or Firm* — Meredith E. Hooker; Nathan T. Lewis

(57) ABSTRACT

Polymeric particles having a size of about 0.1 to about 100 microns comprising at least two different phase separated polymers, at least one pigment, and at least one additive, where the pigment and additive are distributed within the phase separated polymers. Also disclosed are methods for preparing polymeric particles comprising phase separated polymers that comprise additives and pigments, wherein the methods involve molding.

22 Claims, No Drawings though at least one pigment, and at least one additive, or both the at least one pigment and the at least one additive are contained in at least one of the at least two (2) different phase separated polymers.

POLYMERIC PARTICLES AND PROCESSES FOR PREPARATION OF POLYMERIC PARTICLES THAT INVOLVE MOLDING

CROSS-REFERENCE

This application claims the benefit of Provisional Patent Application Ser. No. 60/947,498, filed Jul. 2, 2007.

FIELD OF THE DISCLOSURE

The present invention relates to polymeric particles, and processes for preparing polymeric particles wherein molding is involved.

BACKGROUND OF THE DISCLOSURE

Nanosize to microsize particles produced from organic and inorganic materials are known. Also known is use of such nanosize to microsize particles in various industrial application such as separation, absorbents, and the like.

There remains, however, a need for specific nanosize and microsize polymeric particles that can have various structure and compositions such as core-shell particles, multilayered particles, Janus type particles, and/or contain pigments, crosslinking agents, charge carrying agents, various additives, and the like, all of which are selected for specific applications.

There also is a need for processes for producing polymeric particles that can have various shapes such as spherical, ellipsoidal, toroidal, disk-like, Y-shaped, W-shaped, dendritic, comb-shaped, fractal-type, and the like.

SUMMARY OF THE DISCLOSURE

The present disclosure, in a first embodiment, relates to novel polymeric particles. The polymeric particles are characterized by having a particle size ranging from about 0.1 to about 100 microns, and in another embodiment, about 1 to about 20 microns, and comprise at least two (2) different phase separated polymers, at least one (1) pigment, and at least one (1) additive, wherein the at least one pigment, and the at least one additive, or both the at least one pigment and the at least one additive are contained in at least one of the at least two (2) different phase separated polymers.

In another embodiment, the present disclosure relates to the following methods for preparing polymeric particles that comprise additives, and pigments, as desired.

In one embodiment, a first method for producing polymeric particles comprises high shear mixing at least two different incompatible (immiscible), liquid polymers, at least one of which is crosslinkable, that comprise pigments, and additives such as charge carriers, and the like, under conditions sufficient to generate a composition having a morphology comprising at least two polymer phases, in which at least one liquid polymer is dispersed in another liquid polymer. Optionally, the at least two phase morphology may be stabilized prior to crosslinking particles produced subsequently. The resulting composition comprising the at least two phase morphology of at least one liquid polymer dispersed in another liquid polymer is then molded to form particles, and the resulting polymer particles are thereafter crosslinked in a mold to solidify the particles.

In another embodiment, a second method for producing polymeric particles comprises combining at least two (2) compatible (miscible), liquid polymers, at least one of which is crosslinkable, that comprise pigments, additives such as charge carriers, and the like. Thereafter, the miscible liquid composition is subjected to a temperature change, whether cooling or heating as required, to cause the compatible liquid polymers to become incompatible (immiscible) thereby forming a liquid composition having an at least two (2) phase morphology. Optionally, the at least two phase morphology may be stabilized prior to crosslinking subsequently produced particles. The resulting composition comprising the at least two phase morphology comprising at least one liquid polymer dispersed in another liquid polymer is then molded to form particles, and the resulting polymer particles are thereafter crosslinked in a mold to solidify the particles.

In another embodiment, a third method for producing polymeric particles comprises combining at least two (2) compatible (miscible), liquid polymers, at least one of which is crosslinkable, that comprise pigments, additives such as charge carriers; and the like. The resulting composition comprising compatible liquid polymers is then inserted into a mold to shape the particles as desired. Thereafter, the miscible liquid composition is subjected to a temperature change, whether cooling or heating as required, to cause the compatible liquid polymers to become incompatible (immiscible), thereby forming a liquid composition having an at least two (2) phase morphology. Optionally, the at least two phase morphology may be stabilized prior to crosslinking subsequently produced particles. The resulting polymer particles are thereafter crosslinked in a mold to form solid particles.

In another embodiment, the fourth method for producing polymeric particles comprises combining at least two (2) compatible (miscible), liquid polymers, at least one of which is crosslinkable, that may comprise pigments, additives such as charge carriers, and the like. The resulting composition comprising compatible liquid polymers is then inserted into a mold to shape the particles as desired. Thereafter, at least one of the polymers of the miscible liquid composition is crosslinked in the mold to cause the compatible liquid polymers to become incompatible (immiscible) thereby forming a liquid composition having a morphology of at least two (2) phases. The resulting polymer particles are thereafter further crosslinked in the mold to form solid particles.

Following all of the four (4) methods described herein for producing polymeric particles wherein molding is utilized, the particles that are removed from the mold may be post-treated. The post-treatment of the solidified, crosslinked particles, removed form the mold, may involve a further crosslinking, washing, coating with various substances, and the like.

DETAILED DESCRIPTION OF THE DISCLOSURE

In the polymeric particles herein, and in all the methods described herein, there are utilized pigments and additives. The following description of the pigments and additives is equally suitable for use in the novel polymeric particles, and in all of the methods described herein for producing polymeric particles. The pigments and additives described herein are all suitable for use in the polymeric particles and in all of the methods described herein for producing polymeric particles.

Any crosslinkable polymer whether physically solidifiable, such as by crystallization, or chemically crosslinkable, may be used in producing the novel polymeric particles and in all methods for producing polymeric particles herein. For example, polymeric materials suitable for use include, but are not limited to, any thermoplastic resins, any thermoplastic elastomers, any plastics, any thermosetting resins, or any thermosetting elastomers, and mixtures thereof.

Suitable polymers include, but are not limited to, polyolefins such as polyethylene, polypropylene, polyisobutene, and the like; vinyl and vinylidene polymers such as polyvinyl chloride, poly(vinyl acetate), polyvinyl benzoate and the like; natural and synthetic rubbers such as polybutadiene, polyisoprene, polychloroprene, and the like; polyesters and polycarbonates such as polyethylene terephthalate, and the like; cellulose derivatives such as cellulose acetate, and the like; fluoropolymers; polyorganosilicones; polyethers; polynitriles; polyamides; polyimides; polyurethanes; polyacetylenes; polyacrylics, and the like, and mixtures thereof.

The polymeric particles and methods herein comprise at least one pigment. Any pigment may be utilized.

Suitable pigments include, but are not limited to, flake inorganic fillers such as clay, diatomaceous earth, carbon black, silica, talc, barium sulfate, calcium carbonate, magnesium carbonate, metal oxides such as titanium oxide, color providing pigments, mica, graphite, aluminum hydroxide, and the like; granular or powder solid fillers such as metal powder, wood chips, glass powder, ceramic powder, and the like; natural and synthetic short and long fibers such as straw, wool, glass fibers, metal fibers, polymer fibers, and organic fillers such as starch, protein, cellulose and the like, and mixtures thereof. In one embodiment, the pigments are titanium oxide or another color providing pigment.

The polymeric products and methods herein comprise at least one additive in addition to the at least one pigment. Any additive may be utilized. Suitable additives include, but are not limited to softeners and/or plasticizers; tackifiers; curing agents; antioxidants; surfactants; lubricants; charge carriers; dyes; and the like. These materials are described in more detail, as follows.

Any softeners: such as mineral oils, vegetable oils and synthetic softeners for use in rubbers and resins, and mixtures thereof. Exemplary mineral oils are aromatic, naphthenic, and paraffinic process oils. Exemplary vegetable oils are castor oil, cottonseed oil, linseed oil, rape oil, soybean oil, palm oil, coconut oil, peanut oil, haze tallow, pine oil and olive oil.

Any plasticizer such as ester plasticizers such as phthalates, phthalic mixed esters, aliphatic dibasic acid esters, glycol esters, fatty acid esters, phosphates, and stearates, epoxy plasticizers; other plasticizers for plastics; and plasticizers for NBR such as phthalates, adipates, sebacates, phosphates, polyethers, and polyesters, and mixtures thereof. Also useful are oligomers such as crown ether, fluorinated oligomers, polyisobutylene, xylene resin, chlorinated rubber, polyethylene wax, petroleum resin, rosin ester rubber, polyalkyolene glycol diacrylates, liquid rubbers such as polybutadiene, styrene-butadiene rubber, butadiene-acrylonitrile rubber, and polychloroprene, silicone oligomers, and poly-α-olefins, and mixtures thereof.

Any tackifier such as coumarone resins, coumarone-indene resins; phenol terpene resins, petroleum hydrocarbons, and rosin derivatives, and mixtures thereof.

Any lubricant such as hydrocarbon lubricants such as paraffin and wax, fatty acid lubricants such as higher fatty acids and oxyfatty aids; fatty acid amide lubricants such as fatty acid amides and alkylene bisfatty acid amides; ester lubricants such as fatty acid lower alcohol esters, fatty acid polyhydric alcohol esters and fatty acid polyglycol esters; alcohol lubricants such as aliphatic alcohols, polyhydric alcohols, polyglycols, and polyglycerols; metal soaps, and mixtures.

Other useful materials, such as latex, emulsion, liquid crystal, bitumen, clay, natural starch, saccharides, inorganic silicone oil, and phosphazenes. Also included are animal oils such as beef tallow, lard, horse tallow, chicken oil, and fish oil; honey, fruit juice, chocolate, dairy products such as yogurt; organic solvents such as hydrocarbon, halogenated hydrocarbon, alcohol, phenol ether, acetal, ketone, fatty acid, ester, nitrogen compound and sulfur compound solvents; various pharmaceutical components, soil modifiers, fertilizers, petroleum, water, and aqueous solutions. These materials may be used alone or in admixture.

Also useful additives are charge carriers. Any charge carrier may be used. Suitable charge carriers include, but are not limited to, monomer-type such as onium salts, aromatic-hydroxy-carbonate derivatives, aromatic-carbonate or sulfonate derivatives, phenol derivatives (include metal complex, salt) such as calixarene, compounds containing acidic N—H, O—H derivatives (include metal complex, salt), Schiff-base metal complex, cyclodextrin borate, aniline derivative metal complex, and the like; also suitable are polymer-type such as diallyldialkylammonium salts, imidazolynium salts, quaternary ammonium salts, polyamines, and the like; also suitable are polymer side chain-types, and the like, and mixtures thereof.

Other suitable additives include curing agents, and the like. Suitable curing agents include materials that promote and/or initiate crosslinking of at least one of the polymers such as peroxide, sulfur, azo compounds, UV sensitive initiators, and the like Also suitable for use as additives are any antioxidants. In general, antioxidants are classified into two broad divisions. The divisions depend on whether the antioxidants are soluble in water (hydrophilic) or soluble in lipids (hydrophobic). Examples of antioxidants, but not limited thereto, are ascorbic acid, glutathione, tocopherols and tocotrienols (vitamin E), polyphenol antioxidants, nonpolar antioxidants such as eugenol, and the like.

Also suitable for use as additives are any surfactants. Surfactants are wetting agents that lower the surface tension of a liquid, and lower the interfacial tension between two liquids. Surfactants are usually organic compounds that are amphiphilic, meaning the compounds contain both hydrophobic groups (the tails) and hydrophilic groups (the heads). As such, surfactants are soluble in both organic solvents and water. Surfactants are often classified into four primary groups: anionic, cationic, non-ionic, and zwitterionic (dual charge). Examples of suitable surfactants, but not limited thereto, are ANIONIC SURFACTANTS such as:

Sodium dodecyl sulfate, ammonium lauryl sulfate, and other alkyl sulfate salts

Sodium laureth sulfate, also known as sodium lauryl ether sulfate

Alkyl benzene sulfonate

Soaps, or fatty acid salts;

CATIONIC SURFACTANTS such as:

Cetyl trimethylammonium bromide (CTAB) a.k.a. hexadecyl trimethyl ammonium bromide, and other alkyltrimethylammonium salts Cetypyridinium chloride (CPC Polyethoxylated tallow amine (POEA)

Benzalkonium chloride (BAC)

Benzethonium chloride (BZT);

ZWITTERIONIC SURFACTANTS such as:

Dodecyl betaine

Dodecyl dimethylamine oxide

Cocamidopropyl betaine

Coco ampho glycinate;

NONIONIC SURFACTANTS such as:

Alkyl poly(ethylene oxide)

Copolymers of poly(ethylene oxide) and poly(propylene oxide) (commercially called Poloxmers or Poloxamines)
Alkyl polygucosides, including:
Octyl glucoside
Decyl maltoside
Fatty alcohols
Cetyl alcohol
Oleyl alcohol
Cocamide MEA, cocamide DEA, cocamide TEA The present disclosure, in a first embodiment, relates to novel polymeric particles. The polymeric particles are characterized by having a particle size ranging from about 0.1 to about 100 microns, and in another embodiment, about 1 to about 20 microns, and comprise at least two (2) different phase separated polymers, at least one (1) pigment, and at least one (1) additive, wherein the at least one pigment, or the at least one additive, or both the at least one pigment and the at least one additive are contained in at least one of the at least two (2) different phase separated polymers.

In the polymeric particles herein, the at least one pigment and the at least one additive may be comprised in at least one of the phase separated polymers. More particularly, all of the pigments and additives may be comprised in only one of the polymers, or all of the pigments and additives may be divided among the polymers in varying amounts. The amounts to be used and the distribution thereof will depend upon the particular end use application of the polymeric particle.

The polymeric particles may be prepared by any method known in the art. In particular, however, any of the methods disclosed herein is suitable for producing polymeric particles including the novel polymer particles. The methods are described in detail hereinafter.

The polymeric particles are useful for separation, reverse osmosis, electronic display particles, biosensors, absorbent material, toners, printing equipment, color pigments, inks, calibration, and the like.

In another embodiment, the first method for producing polymeric particles comprises high shear mixing at least two different incompatible (immiscible) liquid polymers, at least one of which is crosslinkable, that comprise pigments and additives such as charge carriers, and the like, under conditions sufficient to generate a composition comprising at least a two phase morphology comprising at least one liquid polymer dispersed in another liquid polymer. Optionally, the at least two stage morphology may be stabilized, for example, to reduce the rate of coalescence, to thereby prevent the size of the dispersed phase from exceeding the size of the final molded particle. The resulting composition comprising the at least two phase morphology comprising at least one liquid polymer dispersed in another liquid polymer is then solidified, and the resulting solid polymer particles are thereafter crosslinked.

If necessary, the at least two phase morphology may be stabilized by any known manner. In particular, the two phase morphology may be stabilized with a surfactant such as a block copolymer.

In the above method that includes high shear mixing, the composition comprising the at least two phase morphology of the at least two incompatible liquid polymers, at least one of which is crosslinkable, is then molded, in a mold having micro-sized cavities, to form polymer particles, and then the particles are crosslinked in the mold to form solid particles. The particles can then be removed from the mold.

In a typical molding process, the molds may consist of one plate having a patterned structure with a multitude of cavities. The cavities are of any shape that is necessary to produce a particle having a selected design such as spherical, cubic, toroidal, ellipsoidal, disk-shaped, Y-shaped, W-shaped, dendritic, comb-shaped, fractal-type, and the like. The molding technique requires that the mold also have a second plate. The second plate may have any shape needed to complement the first plate and provide the desired article. The at least two phase morphology liquid composition is placed into the mold. Upon closing the two plates of the mold, the material is distributed within the cavities having the desired shape. The mold must allow for physical solidification or chemical crosslinking of the polymeric particles. In the instance where crosslinking is to be achieved by ultraviolet (UV) curing, at least one of the plates must be transparent to ultraviolet light.

Specific examples of suitable methods for molding, include but are to limited to the following:

(a) In one embodiment, the materials to be molded can be applied to a conveyor belt, and a mold comprising nano or micron size cavities is then contacted with the belt, at which point the material to be molded fills the cavities and particles of the desired shape and size are formed. The particles are solidified by, for example, cross-linking while in the mold, following which the particles are extracted from the mold.

(b) In another embodiment, a conveyor belt contains nano or micron sized cavities. In this instance, the material to be molded is directly applied to the conveyor belt and fills all the cavities. A flat mold element is then pressed against the belt to complete the molding process. The particles are solidified by, for example, cross-linking, while in the mold, following which the particles are extracted from the mold.

In another embodiment, the molding embodiments described above in (a) and (b) can be modified by utilizing a roll to roll transfer device. This is a well known technology and needs no further explanation. In a roll to roll device, the rolls and belt interact to apply the material to be molded to the cavities, and to maintain pressure between the roll and the belt during the molding of the particles until the particles are solidified by, for example, cross-linking, while in the mold. Subsequently, the formed particles are extracted from the mold.

The molds referred to herein may be formed from any suitable material such as, for example, polysilicones, perfluoropolyethers, and the like.

In this method that includes high shear mixing, the polymeric particles produced in the mold are then crosslinked using any known technique. For example, the polymeric particles may be crosslinked by means of ultraviolet (UV) curing, chemical curing, exposure to ionizing radiation, such as an electron beam, and the like.

In respect of the above method and all other methods herein, there are many ways that are known to incorporate and maintain selectively a pigment or an additive or both, in any of the liquid polymer phases during preparation of the polymeric particles. For example, the pigment or additive or both, may be maintained in the liquid phase by means of covalent or ionic bonding between the pigment or additive and the liquid polymer.

In another embodiment, a second method for producing polymeric particles comprises combining at least two (2) compatible (miscible), liquid polymers at least one of which is crosslinkable, that comprise a pigment and an additive such as charge carriers, and the like. The resulting composition comprising at least two compatible liquid polymers, at least one of which is crosslinkable, pigments and additives, is then subjected to a temperature change, whether cooling or heating as required, to cause the compatible liquid polymers to become incompatible (immiscible) thereby forming a liquid composition having an at least two (2) phase morphology.

One phase is dispersed into another phase. The at least two phase morphology is then placed into a mold to form the particles.

In another embodiment, a third method for producing polymeric particles comprises combining at least two (2) compatible (miscible), liquid polymers, at least one of which is crosslinkable, that comprise pigments, additives such as charge carriers, and the like. The resulting composition comprising compatible liquid polymers is then inserted into a mold to shape the particles as desired. Thereafter, the miscible liquid composition is subjected to a temperature change, whether cooling or heating as required, to cause the compatible liquid polymers to become incompatible (immiscible), thereby forming a liquid composition having an at least two (2) phase morphology. Optionally, the at least two phase morphology may be stabilized prior to crosslinking subsequently produced particles. The resulting polymer particles are thereafter crosslinked to form solid particles.

In another embodiment, a fourth method for producing polymeric particles comprises combining at least two (2) compatible (miscible), liquid polymers, at least one of which is crosslinkable, that may comprise pigments, additives such as charge carriers, and the like. The resulting composition comprising compatible liquid polymers is then inserted into a mold to shape the particles as desired. Thereafter, at least one of the polymers of the miscible liquid composition is crosslinked to cause the compatible liquid polymers to become incompatible (immiscible) thereby forming a liquid composition having a morphology of at least two (2) phases.

In regard to any or all of the methods described herein, any molding technique may be utilized. For example, as above mentioned, in a typical molding process, the molds may consist of one plate having a patterned structure with a multitude of cavities. The cavities are of any shape that is necessary to produce a particle having a selected design such as spherical, cubic, toroidal, ellipsoidal, disk-shaped, Y-shaped, W-shaped, dendritic, comb-shaped, fractal-type, and the like. The molding technique requires that the mold also have a second plate. The second plate may have any shape needed to complement the first plate and provide the desired article. The at least two phase morphology liquid composition is placed into the mold. Upon closing the two plates of the mold, the material that is within the mold is molded into particles having the desired shape. The mold must allow for crosslinking of the polymeric particles. In the instance where crosslinking is to be achieved by ultraviolet (UV) curing, at least one of the plates must be transparent to the ultraviolet light. In one embodiment, the mold is a mold having micro-sized cavities.

Specific examples of suitable methods for molding, include but are to limited to the following:

(a) In one embodiment, the materials to be molded can be applied to a conveyor belt, and a mold comprising nano or micron size cavities is then contacted with the belt, at which point the material to be molded fills the cavities and particles of the desired shape and size are formed. The particles are solidified by, for example, cross-linking while in the mold, following which the particles are extracted from the mold.

(b) In another embodiment, a conveyor belt contains nano or micron sized cavities. In this instance, the material to be molded is directly applied to the conveyor belt and fills all the cavities. A flat mold element is then pressed against the belt to complete the molding process. The particles are solidified by, for example, cross-linking, while in the mold, following which the particles are extracted from the mold.

In another embodiment, the molding embodiments described above in (a) and (b) can be modified by utilizing a roll to roll transfer device. This is a well known technology and needs no further explanation. In a roll to roll device, the rolls and belt interact to apply the material to be molded to the cavities, and to maintain pressure between the roll and the belt during the molding of the particles until the particles are solidified by, for example, cross-linking, while in the mold. Subsequently, the formed particles are extracted from the mold.

The molds referred to herein may be formed from any suitable material such as, for example, polysilicones, perfluoropolyethers, and the like.

In regard to any or all of the methods described herein, any manner of crosslinking may be used in the crosslinking of the polymeric particles. For example, the polymeric particles may be crosslinked by means of ultraviolet (UV) curing, chemical curing, exposure to ionizing radiation, such as an electron beam, and the like.

In respect of all of the methods described herein, there are many ways that are known to incorporate and maintain selectively a pigment or an additive or both, in any of the liquid polymer phases during preparation of the polymeric particles. For example, the pigment or additive or both, may be maintained in the liquid phase by means of covalent or ionic bonding between the pigment or additive and the liquid polymer.

Following all of the four (4) methods described herein for producing polymeric particles wherein molding is utilized, the particles that are removed from the mold may be post-treated. The post-treatment of the solidified, crosslinked particles, removed from the mold, may involve a further crosslinking, washing, coating with various substances, and the like.

It should be clearly understood that the forms of the invention herein described are illustrative only and are not intended to limit the scope of the invention. The present invention includes all modifications falling within the scope of the following claims.

What is claimed is:

1. A method for preparing a polymeric particle comprising:
   (a) providing a first composition comprising at least two different, compatible, liquid polymers, at least one of which is crosslinkable, at least one pigment, and at least one additive,
   (b) subjecting the first liquid composition to a temperature change that causes the compatible liquid polymers to become incompatible liquid polymers resulting in the formation of a second composition comprising an at least two phase morphology,
   (c) molding the second composition in a mold to form molded polymer particles, and
   (d) crosslinking the molded polymer particles, while in the mold;
   wherein the molded polymer particles have a particle size of about 0.1 to about 100 microns.

2. The method of claim 1, wherein the temperature change is an increase in temperature.

3. The method of claim 1, wherein the temperature change is a decrease in temperature.

4. The method of claim 1, wherein the morphology of the second composition is stabilized.

5. The method of claim 4, wherein the morphology of the second composition is stabilized by incorporating a surfactant.

6. The method of claim 1, wherein the mold comprises micro-sized particle-shaped cavities.

7. The method of claim 1, wherein crosslinking in the mold is achieved by ultraviolet curing.

8. The method of claim 1 further comprising removing the crosslinked particles from the mold and post-treating the crosslinked particles.

9. A method for preparing a polymeric particle comprising:
(a) providing a first composition comprising at least two different, compatible, liquid polymers, at least one of which is crosslinkable, at least one pigment, and at least one additive,
(b) molding the first composition in a mold, to form a second molded polymer particle composition,
(c) subjecting the second molded polymer particle composition, while in the mold, to a temperature change that causes the compatible liquid polymers to become incompatible liquid polymers resulting in the formation of a third molded polymer particle composition comprising an at least two phase morphology, and
(d) crosslinking the resultant molded polymer particles composition while in the mold;
wherein the molded polymer particles have a particle size of about 0.1 to about 100 microns.

10. The method of claim 9, wherein the temperature change is an increase in temperature.

11. The method of claim 9, wherein the temperature change is a decrease in temperature.

12. The method of claim 9, wherein the morphology of the third molded polymer particle composition formed in the mold, is stabilized.

13. The method of claim 12, wherein the morphology of the third molded polymer particle composition formed in the mold is stabilized by incorporating a surfactant.

14. The method of claim 9, wherein the mold comprises micro-sized particle-shaped cavities.

15. The method of claim 9, wherein the crosslinking in the mold is achieved by ultraviolet curing.

16. The method of claim 9 further comprising removing the crosslinked particles from the mold and post-treating the crosslinked particles.

17. A method for preparing a polymeric particle comprising:
(a) providing a first composition comprising at least two different, compatible, liquid polymers, at least one of which is crosslinkable, at least one pigment, and at least one additive,
(b) molding the first composition in a mold to form a second molded polymer particle composition, wherein the second molded polymer particle composition is in the form of particles, and
(c) crosslinking the second molded polymer particle composition, while in the mold, to cause the compatible liquid polymers to become incompatible, thereby forming a third liquid polymer particle composition comprising an at least two phase morphology;
wherein the molded polymer particles have a particle size of about 0.1 to about 100 microns.

18. The method of claim 17, wherein the morphology of the third polymer particle composition is stabilized.

19. The method of claim 18, wherein the morphology of the third polymer particle composition is stabilized by incorporating a surfactant.

20. The method of claim 17, wherein the mold comprises micro-sized particle-shaped cavities.

21. The method of claim 17, wherein the crosslinking in the mold is achieved by ultraviolet curing.

22. The method of claim 17 further comprising removing the crosslinked particles from the mold and post-treating the crosslinked particles.

* * * * *